United States Patent [19]

Khcheyan et al.

[11] 3,893,948

[45] July 8, 1975

[54] CATALYST OF REDUCING-DEHYDRATING TYPE FOR SYNTHESIZING VINYLAROMATIC COMPOUNDS AND METHOD OF PREPARING IT

[76] Inventors: Khachik Egorovich Khcheyan, prospekt Mira, 118a, kv. 190; Ninel Iosifovna Yakovich, ulitsa Fadeeva 6, kv. 108; Larisa Borisovna Kotelnikova, ulitsa Gertsena 10/5, kv. 28; Alexei Fedorovich Pavlichev, Nikitinskaya ulitsa 6, kv. 13; Nina Nikolaevna Zhilnina, ulitsa Alimova, kv. 1, all of Moscow, U.S.S.R.

[22] Filed: May 21, 1973

[21] Appl. No.: 362,075

[52] U.S. Cl. .......................... 252/440; 260/669 QZ
[51] Int. Cl. ............................................. B01j 11/82
[58] Field of Search ............... 252/440; 260/669 QZ

[56] References Cited
UNITED STATES PATENTS

| | | | |
|---|---|---|---|
| 2,465,486 | 3/1949 | Rosenthal | 260/669 QZ |
| 2,542,551 | 2/1951 | McKeever et al. | 260/669 QZ |
| 3,375,289 | 3/1968 | Khehejan et al. | 260/669 QZ |
| 3,439,059 | 4/1969 | Yakovich et al. | 260/669 QZ |

*Primary Examiner*—Patrick P. Garvin

[57] ABSTRACT

A reducing-dehydrating catalyst for synthesizing vinylaromatic compounds from aromatic carbonylic compounds, consisting mainly of 5 – 50 per cent by weight of magnesium sulfate and 50 – 95 per cent by weight of zinc oxide. The catalyst can also contain magnesium oxide, in which case the composition of the catalyst is as follows: $MgSO_4$ 5 – 20 per cent by weight, ZnO 45 – 88 per cent by weight and MgO 2 – 45 per cent by weight.

The catalyst can contain also an additive of a hydroxide of an alkali metal taken in the amount from 0.05 to 1 per cent of the total weight of the catalyst.

The catalyst is prepared by mixing an aqueous solution of magnesium sulfate and a suspension of zinc oxide, with subsequent evaporation of the reaction mixture, drying the prepared product and calcining it at a temperature from 250° to 400°C.

The catalyst of the invention can be used for synthesizing divinylbenzenes from diacetylbenzenes, styrene from acetophenone, ethylvinylbenzene from ethylacetophenone and other vinylaromatic compounds by a single-step process, the yields and the purity of the final products being high.

6 Claims, No Drawings

CATALYST OF REDUCING-DEHYDRATING TYPE FOR SYNTHESIZING VINYLAROMATIC COMPOUNDS AND METHOD OF PREPARING IT

The invention relates to catalysts of the reducing-dehydrating type intended for synthesis of vinylaromatic compounds from aromatic carbonylic compounds and the method for preparing the said catalyst.

The oxides of metals belonging to the second group of the Periodic System are known to be used as catalysts of the selective reduction of unsaturated carbonylic compounds in the vapor phase in the presence of primary and secondary alcohols.

Magnesium sulfate is also known to be used as a dehydrating catalyst, for example, for dehydrating bis (alphahydroxyethyl)-benzene to prepare divinylbenzene.

Thus, a three-step process for preparing individual isomers of divinylbenzene of high purity is known in the art. In this method, diethylbenzene is oxidized into diacetylbenzene, which is then reduced to bis(alpha-hydroxyethyl)benzene with a secondary alcohol in the presence of aluminum alcoholate of the corresponding alcohol, or with hydrogen in the presence of a hydrogenation catalyst.

The third step of the process is the dehydration of bis (alpha-hydroxyethyl)benzene to divinylbenzenes in the presence of magnesium sulfate.

We proposed earlier a method for preparing divinylbenzenes of high purity from diacetylbenzenes by a single-step process in the presence of a catalyst consisting of MgO and $MgSO_4$.

The said catalyst is prepared by mixing solutions of magnesium sulfate with a hydroxide of an alkali metal in the proportion that would ensure the conversion of not less than 50 per cent of magnesium sulfate into magnesium hydroxide. The solution is then evaporated, the precipitate is separated on a filter, washed with water, dried, crushed and calcined at a temperature from 250° to 450°C to convert magnesium hydroxide into magnesium oxide.

The mechanical strength of the thus prepared catalyst is about 20 kg/sq.cm.

The patent has not covered the composition of the catalyst.

The said catalyst ensures the preparation of divinylbenzenes of high purity from diacetylbenzenes by a singlestep process.

However, the described method cannot be used to prepare catalysts of definite quantitative composition, which makes it difficult to use industrially. For this reason, the preparation of catalysts of definite composition for use in the synthesis of divinylbenzenes from diacetylbenzenes still remains a problem and hence requires further investigation.

The essential and main object of this invention is therefore the working out of a catalyst of the reducing-dehydrating type of definite composition.

Another object of the invention is to work out a catalyst having mechanical strength higher than that of the catalyst consisting of magnesium sulfate and magnesium oxide.

The object of the invention is also to work out a method for preparing the catalyst by a simple process.

These objects have been attained in a catalyst of the reducing-dehydrating type for synthesis of vinylaromatic compounds from aromatic carbonylic compounds, which, according to the invention, consists of 5–50 per cent by weight of magnesium sulfate and 50–95 per cent by weight of zinc oxide. The best results have been attained with catalysts which consisted of 10–20 per cent by weight of magnesium sulfate and 80–90 per cent by weight of zinc oxide.

Magnesium oxide is added to the catalyst to increase its activity. In this case the composition of the catalyst is as follows: 5–20 per cent by weight of magnesium sulfate, 45–88 per cent of zinc oxide and 2–45 per cent by weight of magnesium oxide, preferably 10 per cent by weight of magnesium sulfate, 80–85 per cent by weight of zinc oxide and 5–10 per cent by weight of magnesium oxide.

The catalyst can also contain an additive of a hydroxide of an alkali metal taken in an amount of 0.05–1.00 per cent of the total catalyst weight.

Sodium hydroxide can be used as the hydroxide of an alkali metal.

The preferable composition of the catalyst is as follows:
 magnesium sulfate, 10–20 per cent by weight;
 zinc oxide, 80–90 per cent by weight;
 sodium hydroxide, 0.1 per cent by weight.

The catalyst according to the invention is prepared by mixing an aqueous solution of magnesium sulfate with a suspension of zinc oxide. The prepared mixture is then stirred, evaporated, the residue is dried, preferably at a temperature of 100–120°C, crushed and calcined at a temperature of 250–400°C.

The calcining should preferably be carried out in a current of air, and then in a vacuum.

When preparing a catalyst consisting of $MgSO_4$, MgO and ZnO, an aqueous solution of magnesium sulfate is mixed with a suspension of magnesium oxide and zinc oxide. The other operations are performed in the same sequence as described above.

The catalyst containing an additive of sodium hydroxide is prepared by mixing aqueous solutions of magnesium sulfate, sodium hydroxide and a suspension of zinc oxide.

The further procedure is the same as described above. The proposed method ensures the preparation of a catalyst having a definite composition (as specified above).

The catalyst has high selectivity and does not practically dehydrate alcohol used as a reducing agent.

The mechanical strength of the catalyst is about 50–60 kg/sq.cm.

Our investigation has shown that the reducing-dehydrating catalyst can be used not only for synthesizing divinylbenzenes from diacetylbenzenes, but also for synthesizing some other vinylaromatic compounds, for example, styrene from acetophenone, ethylvinylbenzene from ethylacetonphenone, etc.

The proposed catalyst can be used to synthesize various vinylaromatic compounds from aromatic carbonylic compounds by a single-step process, the purity of the final product being up to 98–100 per cent and the yield of the product being 85–90 per cent with reference to the carbonylic compound.

For a better understanding of the invention the following examples of its practical embodiment are given by way of illustration.

EXAMPLE 1

A catalyst consisting of 10 per cent by weight of magnesium sulfate and 90 per cent by weight of zinc oxide was prepared by the following procedure.

90 g of zinc oxide and 200 ml of distilled water were loaded into a 0.5 liter flask with a stirrer. A solution of 20.5 g of $MgSO_4·7H_2O$ in 50 ml of water was added and the contents were mixed for five hours. The mixture was then evaporated, the prepared product dried at 100°–120°C, crushed into granules sizing 3–5 mm, sieved, and calcined for ten hours at a temperature of 380–400°C in a current of air, and finally in vacuum.

The catalyst was tested in the following conditions. A solution of 5 g of m-diacetylbenzene in 40 g of isopropyl alcohol was charged into a reaction kettle containing the catalyst. The reaction temperature was maintained at 320°C and the residual pressure was 50 mm Hg.

The resultant product contained 90.5 per cent of m-divinylbenzene. The yield of the product was 86.3 per cent, calculating with reference to the starting m-diacetylbenzene.

The pure product (96.5 per cent m-divinylbenzene) was prepared by distillation under residual pressure of 2 mm Hg.

EXAMPLE 2

A catalyst consisting of 50 per cent of magnesium sulfate and 50 per cent by weight of zinc oxide was prepared by mixing 102.5 g of $MgSO_4.7H_2O$ in 150 ml of distilled water with a suspension of 50 g of zinc oxide in 100 ml of water.

The further procedure was the same as described in the previous Example 1.

The catalyst was tested under the conditions described in Example 1. The resultant product contained 81.9 per cent of m-divinylbenzene. The m-divinylbenzene having the purity of 90.4 per cent was isolated by distillation in vacuum.

EXAMPLE 3

The catalyst consisting of 10 per cent of magnesium sulfate, 45 per cent by weight of zinc oxide and 45 per cent by weight of magnesium oxide was prepared as follows.

45 g of zinc oxide, 45 g of magnesium oxide and 200 ml of distilled water were loaded into a 0.5 liter flask, and then 20.5 g of $MgSO_4.7H_2O$ in 50 ml of water were added with stirring.

The further procedure was the same as described in Example 1, except that the catalyst was calcined at a temperature of 300°C for 12 hours, first in a current of air and then in vacuum. The catalyst was tested under the conditions described in Example 1. The resultant product contained 97.5 per cent of m-divinylbenzene. The yield was 90 per cent calculating with reference to m-diacetylbenzene. After distillation in vaccum the purity of the product was 98.8 per cent.

EXAMPLE 4

A catalyst consisting of 10 per cent by weight of magnesium sulfate, 85 per cent by weight of zinc oxide and 5 per cent by weight of magnesium oxide was prepared by the following procedure. 85 g of zinc oxide, 5 g of magnesium oxide and 200 ml of distilled water were loaded into a 0.5 liter flask. 20.5 g of $MgSO_4.7H_2O$ in 50 ml of water were then added to the prepared suspension with stirring.

The further procedure was the same as described in Example 1.

The catalyst was tested under the conditions described in EXample 1. The resultant product contained 99.0 per cent of m-divinylbenzene. The yield was 87 per cent with reference to m-diacetylbenzene.

EXAMPLE 5

A catalyst consisting of 10 per cent by weight of magnesium sulfate, 85 per cent by weight of zinc oxide and 5 per cent by weight of magnesium oxide was prepared by the procedure described in Example 4 and tested under the following conditions. A solution of 5 g of p-diacetylbenzene in 50 g of isopropyl alcohol, preheated to 50°C, was charged into a reactor filled with the catalyst. The further procedure was similar to that described in Example 1. The resultant product contained 98.9 per cent of p-divinylbenzene, the yield being 87 per cent, with reference to p-diacetylbenzene.

EXAMPLE 6

A catalyst consisting of 10 per cent by weight of magnesium sulfate, 85 per cent by weight of zinc oxide and 5 per cent by weight of magnesium oxide was prepared by the procedure described in Example 4 and tested in the following conditions. A solution of 5 g of acetophenone in 20 g of isopropyl alcohol was delivered into a reaction kettle filled with the catalyst. Then the conditions described in Example 1 were followed. The resultant product contained 98.4 per cent of styrene, the yield being 85.2 per cent, calculating with reference to acetophenone.

EXAMPLE 7

A catalyst having the composition and prepared as described in Example 4 was tested in the following conditions.

A solution of 5 g of p-ethylacetophenone in 20g of isopropyl alcohol was loaded into a reaction kettle filled with the catalyst.

The procedure was the same as described in Example 1, and the resultant product contained 98.2 per cent of p-ethylvinylbenzene, the yield being 87 per cent, calculating with reference to n-ethylacetophenone.

EXAMPLE 8

A catalyst consisting of 10 per cent by weight of magnesium sulfate, 90 per cent by weight of zinc oxide and containing an additive of 0.1 per cent by weight of sodium hydroxide, was prepared by the following procedure. To an aqueous suspension of 90 g of zinc oxide in 200 ml of distilled water were added with stirring 20.5 g of $MgSO_4·7H_2O$ and 0.1 g of sodium hydroxide in 50 ml of water.

The further procedure for preparing the catalyst was the same as described in Example 1.

The thus prepared catalyst was used for synthesizing (under the conditions and from the starting component as specified in Example 1) a product containing 93.2 per cent m-divinylbenzene, which was then distilled in vacuum to prepare m-divinylbenzene of 96.8 per cent purity.

EXAMPLE 9

A catalyst consisting of 10 per cent by weight of magnesium sulfate, 90 per cent by weight of zinc oxide and containing an additive of 1 per cent by weight of sodium hydroxide was prepared by the following procedure. To an aqueous suspension of 90 g of zinc oxide in 200 ml of distilled water, were added with stirring solutions of 20.5 g of $MgSO_4 \cdot 7H_2O$ and 1 g of sodium hydroxide in 50 ml of water. The further procedure for preparing the catalyst was the same as described in Example 1.

The catalyst was used to prepare (under the conditions described in Example 1) a product containing 70.2 per cent m-divinylbenzene, which was then distilled in vacuum to obtain the product of 86 per cent purity.

What we claim is:

1. A reduction-dehydration catalyst for the synthesis of vinylaromatic compounds consisting of 5–50 wt. percent of magnesium sulfate and 50–95 wt. percent of zinc oxide.

2. A catalyst as claimed in claim 1 consisting of 10–20 wt. percent of magnesium sulfate and 80–90 wt. percent of zinc oxide.

3. A reduction-dehydration catalyst for the synthesis of vinylaromatic carbonyl compounds from aromatic compounds consisting of 5–20 wt. percent of magnesium sulfate, 45–88 wt. percent of zinc oxide, and 2–45 wt. percent of magnesium oxide.

4. A catalyst as claimed in claim 3 consisting of 10 wt. percent of magnesium sulfate, 80–85 wt. percent of zinc oxide, and 5–10 wt. percent of magnesium oxide.

5. A reduction-dehydration catalyst for the synthesis of vinylaromatic compounds from aromatic carbonyl compounds consisting of 10–20 wt. percent of magnesium sulfate, 80–90 wt. percent of zinc oxide, and 0.05–1 wt. percent of an alkali metal hydroxide based on the total catalyst weight.

6. A catalyst as claimed in claim 5 consisting of 10–20 wt. percent of magnesium sulfate, 80–90 wt. percent of zinc oxide, and 0.1 wt. percent of sodium hydroxide.

* * * * *